US006788300B2

(12) United States Patent
Ramaswami et al.

(10) Patent No.: US 6,788,300 B2
(45) Date of Patent: Sep. 7, 2004

(54) VIRTUAL INTERACTIVE SOLIDS WITH DYNAMIC MULTIMEDIA

(75) Inventors: Krishnan Ramaswami, Bangalore (IN); Friedrich B. Prinz, Menlo Park, CA (US)

(73) Assignee: The Board of Trustees of the Leland Stanford Junior University, Stamford, CA (US)

( * ) Notice: Subject to any disclaimer, the term of this patent is extended or adjusted under 35 U.S.C. 154(b) by 452 days.

(21) Appl. No.: 09/928,232

(22) Filed: Aug. 9, 2001

(65) Prior Publication Data

US 2002/0109683 A1 Aug. 15, 2002

Related U.S. Application Data

(60) Provisional application No. 60/224,177, filed on Aug. 9, 2000.

(51) Int. Cl.[7] .............................................. G06T 17/00
(52) U.S. Cl. ....................................................... 345/420
(58) Field of Search ......................................... 345/420

(56) References Cited

U.S. PATENT DOCUMENTS 6,664,975 B1 * 12/2003 Hatch .......................... 345/622
6,697,869 B1 *  2/2004 Mallart et al. ............... 709/231

OTHER PUBLICATIONS

Frtiz Prinz and Krishnan Ramaswami, "Virtual Interactive Solids with Dynamic Multimedia– Virtual Interactive Models (VIM)". 2000. Stanford University.*

Hansrudi Noser and Peter Stucki, "Dynamic 3D Visualization of Database–Defined Tree Structures on the WWW by Using Rewritting Systems". Jun. 8–9, 2000. University of Zurich.*

* cited by examiner

Primary Examiner—Joseph Mancuso
Assistant Examiner—William Lehner
(74) Attorney, Agent, or Firm—Lumen Intellectual Property Services, Inc.

(57) ABSTRACT

A method and system for generating a three-dimensional virtual interactive model of an object to be displayed to a viewer. The model is prepared in the form of a VIS tree built up of four types of nodes including primitive nodes indicating geometrical attributes of the object as well as at least one non-geometrical attribute, interaction nodes coding dynamic behaviors of the object, transformation nodes coding transformation behaviors of the object and operations nodes coding combinatorial operations to be performed on a combination of at least one of the primitive, interaction and transformation nodes. The VIS tree constructed in this manner has a small file size, such that a user can view and interact with the model over a network without high link bandwidth requirements.

18 Claims, 4 Drawing Sheets

VIRTUAL INTERACTIVE SOLIDS WITH DYNAMIC MULTIMEDIA

RELATED APPLICATIONS

This application claims priority from provisional application 60/224,177 filed on Aug. 9, 2000 which is herein incorporated by reference.

FIELD OF THE INVENTION

This invention relates generally to computer-aided design (CAD) models of three-dimensional objects. More particularly, it relates to a modeling system and file type for representing solid objects.

BACKGROUND

Recent years have witnessed rapid advances in the field of communication networks, including the growth of the world wide web. The web has made it possible for large numbers of users to share information and download files from remote data servers to their personal computers. In general, the information posted on the web is of the multi-media type, i.e., it includes data files with text, sound, graphics, pictures, photographs, video and other types of data. Some of this information is stored in large files and hence accessing it for viewing and/or listening purposes as well as downloading places high requirements on the link bandwidth between the user and the remote data server. It is therefore important that information shared over the web be packaged in files of minimal size.

Virtually all companies making consumer products have a web presence. Most of these companies display their products on the web by using descriptive text and pictures, since such files do not place an excessively high demand on link bandwidth. Unfortunately, using pictures to promote products does not give the consumer a real feel for the product. In order to make an informed decision, the consumer should have the ability to see, interact with and get an appreciation for the merchandise in its true three-dimensional form. The ability to get to know the product in this manner will provide the consumer with a shopping experience akin to that obtained in the real world.

As an additional service, many companies would like to provide maintenance manuals for their products online. Typical printed manuals accompanying their products tend to only include two-dimensional pictures and explanatory text. Given the multimedia capability of the web, the companies could provide their users with enhanced manuals illustrating the operation of their products and methods for performing routine inspections and adjustments of the products. The main obstacle to providing such services is the minimal network bandwidth and the lack of appropriate three-dimensional tools to create the models.

The prior art provides many data formats for making models of three-dimensional solid objects. In conventional computer aided design (CAD), a CSG tree is used to represent a solid. In CSG a solid is built up by combining simple geometric primitives (such as cubes, spheres, cones, etc.) using Boolean set operators and linear transformations. The object is stored as a tree. In addition to being a representational form, it also facilitates graphical interaction that enables engineering parts to be built up. Solids stored in a CSG tree have a compact file size.

Unfortunately, CSG has its limitations. It is a purely geometrical representation, in that only the geometry of the object can be represented using CSG. Hence, it is not possible to built interactive objects with multimedia and animation capabilities based on the CSG representation of solids.

The prior art also offers other formats for displaying three-dimensional objects on the web. These include VRML and X3D formats. Unfortunately, the file sizes obtained when using these formats are very large and are comparatively poor in features.

In sum, prior art formats for minimizing the sizes of data files and providing functionalities such as animation of the three-dimensional models are not satisfactory. The tradeoffs between sizes of the resultant files and the level of functionality are still not optimized and place excessive demands on link bandwidths.

OBJECTS AND ADVANTAGES

In view of the above, it is an object of the present invention to provide a method and file type for representing three-dimensional objects in a format optimized for the available network bandwidth.

It is another object of the invention to provide a file format which is capable of providing multiple functionalities to the three-dimensional objects stored in this format and is suitable for applications involving networks. Specifically, the file format is to provide for animation capabilities and representation of non-geometric attributes of the models.

These and other objects and advantages of the invention will become apparent upon reading the detailed description.

SUMMARY

The present invention provides a method of making a three dimensional virtual interactive model of an object to be displayed to a viewer. In accordance with the method, the object is translated into primitive nodes indicating geometrical attributes of the object as well as at least one non-geometrical attribute of the object. The object and its parts can perform dynamic behaviors and transformation behaviors. Dynamic behaviors of the object are coded in the form of interaction nodes and transformation behaviors of the object are coded in the form of transformation nodes. Combinatorial operations to be performed on a combination of at least one of the primitive nodes, interaction nodes and transformation nodes are coded in operations nodes. The three dimensional virtual interactive model of the object is built in the form of a tree using the primitive nodes, the interaction nodes, the transformation nodes and the operations nodes.

The tree representing the three-dimensional model of the object is a combination of all four types of nodes. The leaves of this tree are the primitive nodes. Since the tree stores the modeling history of the object, it is possible to easily edit or modify the object.

The dynamic behaviors and transformation behaviors of the object are determined from the functions the object is to perform and the manner in which the model is to interact with the viewer. The non-geometrical attribute can be selected from any number of possible attributes and can include attributes such as color, texture and transparency. The dynamic behaviors of the object include behaviors such as movements and sounds. The transformation behaviors include behaviors such as translation, rotation and scaling.

In a preferred embodiment the object, or rather the three-dimensional virtual model of the object is displayed to the viewer over a network. Because the size of the tree representing the model can be stored in a file that is small, the model can be easily displayed over a network having a comparatively low link bandwidth. For example, the network is the world wide web. Furthermore, it is convenient that the tree be constructed via a platform-independent interface.

The method of the invention can be encoded in proper software and stored. Hence, the invention further includes storing the steps involved in transforming the object into the model by building the tree. These steps can be stored in a suitable storage medium, such as a disk or any other local or distributed memory.

The particulars of the invention will now be explained in detail in the ensuing detailed description with reference to the enclosed drawing figures.

BRIEF DESCRIPTION OF THE DRAWING FIGURES

DETAILED DESCRIPTION

The preferred embodiment of the present invention is for a web-enabled modeling system for generating representations of three-dimensional objects. A person skilled in the art will appreciate that other applications of the modeling system are within the scope of the invention. Hence, the ensuing description is to be construed as an exemplary embodiment of the invention without being limiting on the claimed invention.

Figure 1:
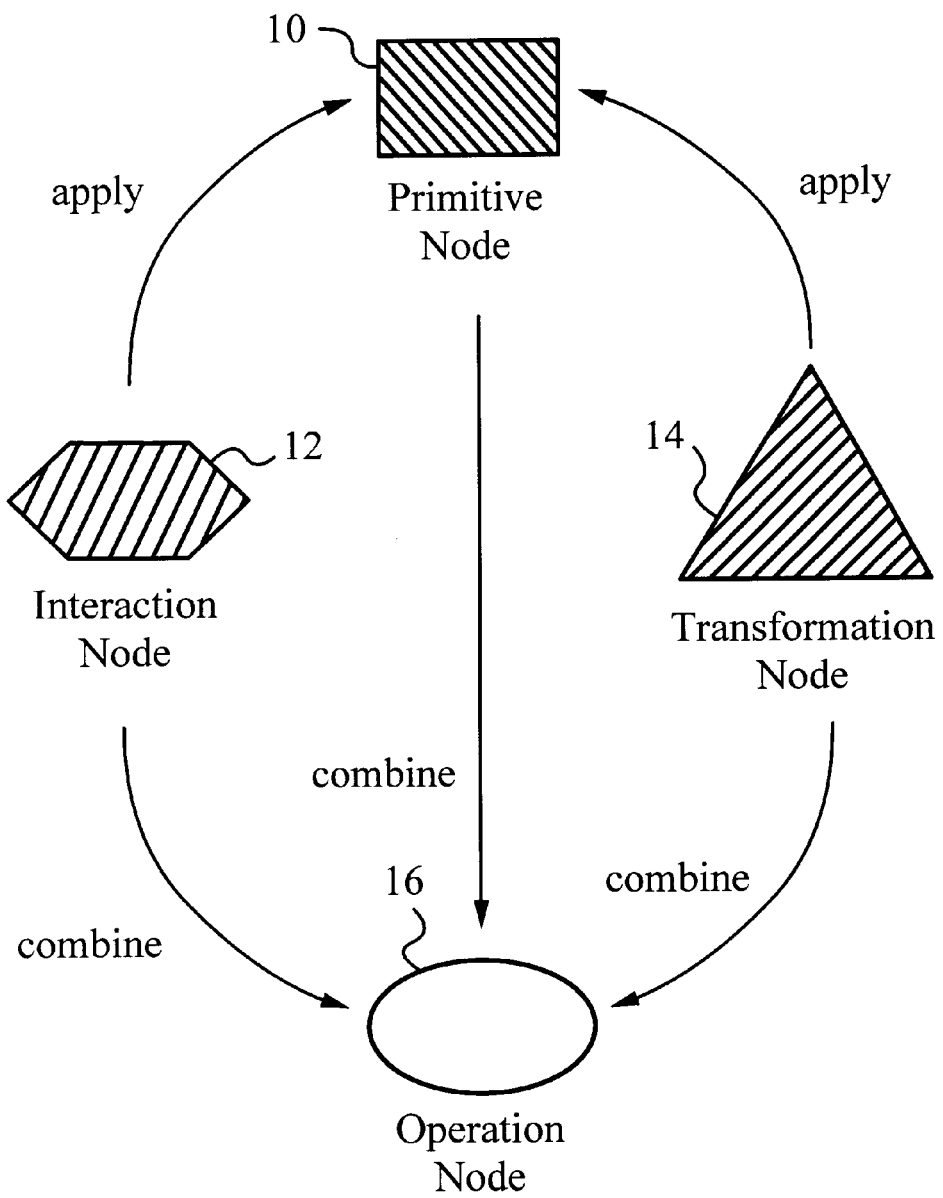
FIG. 1 is a schematic diagram illustrating the four types of nodes used in constructing a tree of the three-dimensional virtual interactive model of the object to be displayed to a viewer.

FIG. 1 illustrates the fundamental principles of constructing a three-dimensional virtual interactive model of any object. Specifically, the model is represented by a tree of nodes in the virtual interactive solids (VIS) format. There are four types of nodes in this format.

A primitive node 10 indicates geometrical attributes of the object or parts of the object to be modeled. These geometrical attributes are data described in VIS format, as is known to those skilled in the art. In addition to the geometrical attributes, primitive node 10 indicates one or more non-geometrical attributes of the object or parts of the object. These non-geometrical attributes can be attributes such as color, texture and transparency and they are also coded in the VIS format.

An interaction node 12 contains information that relates to a dynamic behavior of the object or a part of the object. The possible dynamic behaviors of the object or any of its parts include behaviors such as movements and sounds.

A transformation node 14 contains information that relates to a transformation behavior of the object or a part of the object. The possible transformation behaviors of the object or any of its parts include behaviors such as translation in space, rotation around any suitable axis or axes and scaling.

An operation node 16 is the building block of the tree to be constructed and it is used to bring together or combine any suitable combination of nodes 10, 12 and 14. In other words, combinatorial operations to be performed on a combination of at least one of nodes 10, 12 and 14 are coded in operations nodes.

The three dimensional virtual interactive model of the object is built in the form of a tree and typically uses more than one of each type of nodes 10, 12, 14 and 16. In building the tree interaction node 12 is applied to primitive node 10 to dictate the dynamic behavior of the object or part of the object encoded in primitive node 10. Transformation node 14 is also applied to primitive node 10 to dictate the transformation behavior of the object or part of the object encoded in primitive node 10. Operation node 16 combines one or more of nodes 10, 12, 14 into a single model object with the desired dynamic behaviors and transformation behaviors. In other words, a model object is built by applying interaction and transformation nodes 12, 14 to a number of primitive nodes such as node 10 and combining them using operations node 16. The leaf node of the tree is always a VIS primitive node 10. Since the representation also stores the modeling history, it is possible to easily edit the model, as will be appreciated by those skilled in the art.

A VIS file is used to store the VIS tree. The file contains all the relevant information needed to build the model. Preferably, all nodes 10, 12, 14 and 16 are represented in VIS format within brackets as follows: [Node-ID, Node Type, Node Parameters]. Node-ID is the unique ID assigned to that node. Node Type is the type of node and Node Parameters are the parameters relevant to that node type. Models stored in this type of VIS file format can be parsed, e.g., by a java applet for displaying to a user over the world wide web.

Figure 2:
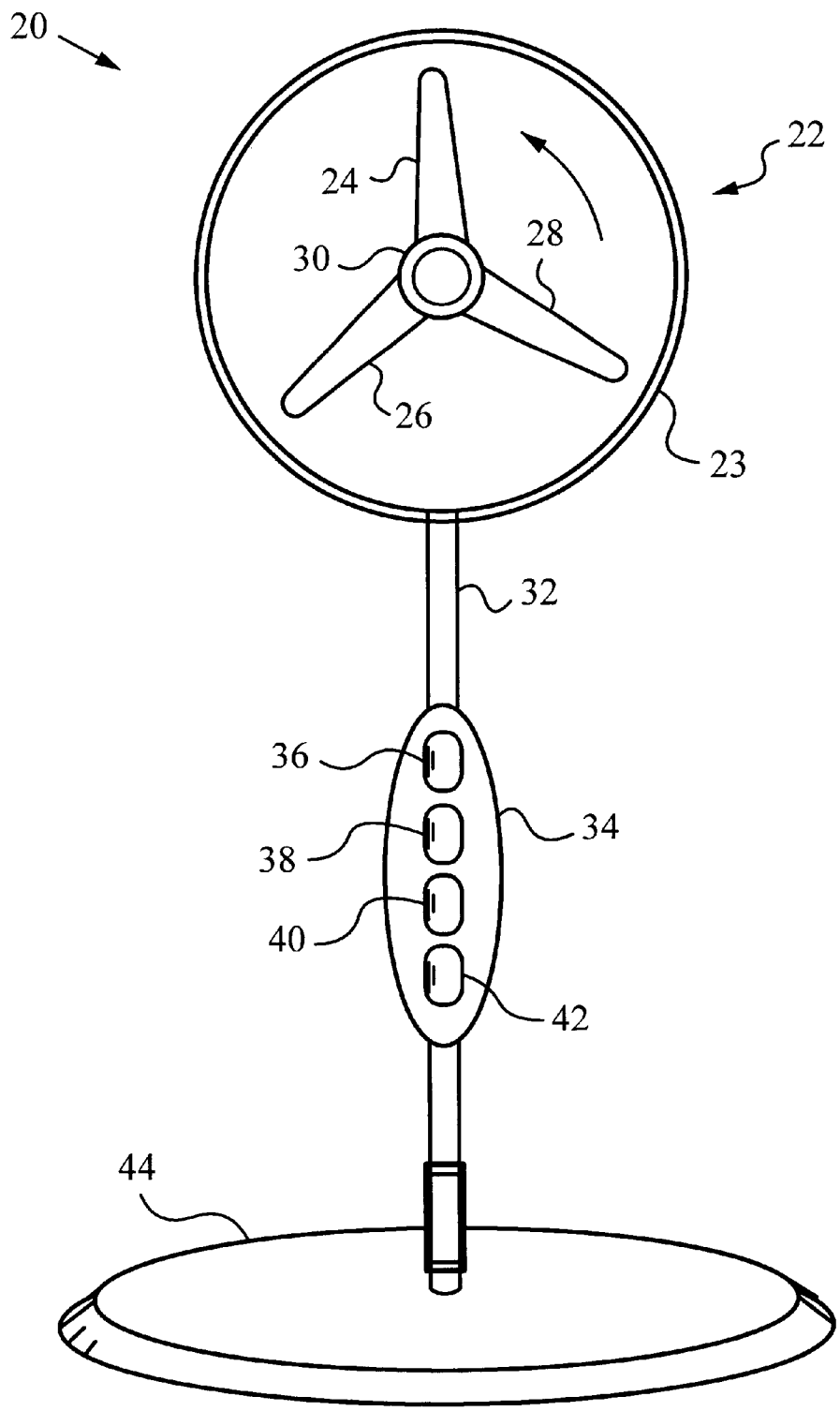
FIG. 2 is an exemplary object to be displayed to the viewer.

FIG. 2 illustrates an exemplary object 20, in this case a fan, whose three-dimensional virtual interactive model is to be displayed to a user. Fan 20 has a blade assembly 22 with three blades 24, 26, 28 mounted on a central axle 30. Fan 20 has a telescoping static rod 32 supporting blade assembly 22. Static rod 32 is embedded in a base 44. Fan 20 has a control console 34 with three speed control buttons 36, 38, 40 and a stop button 42.

Figure 3:
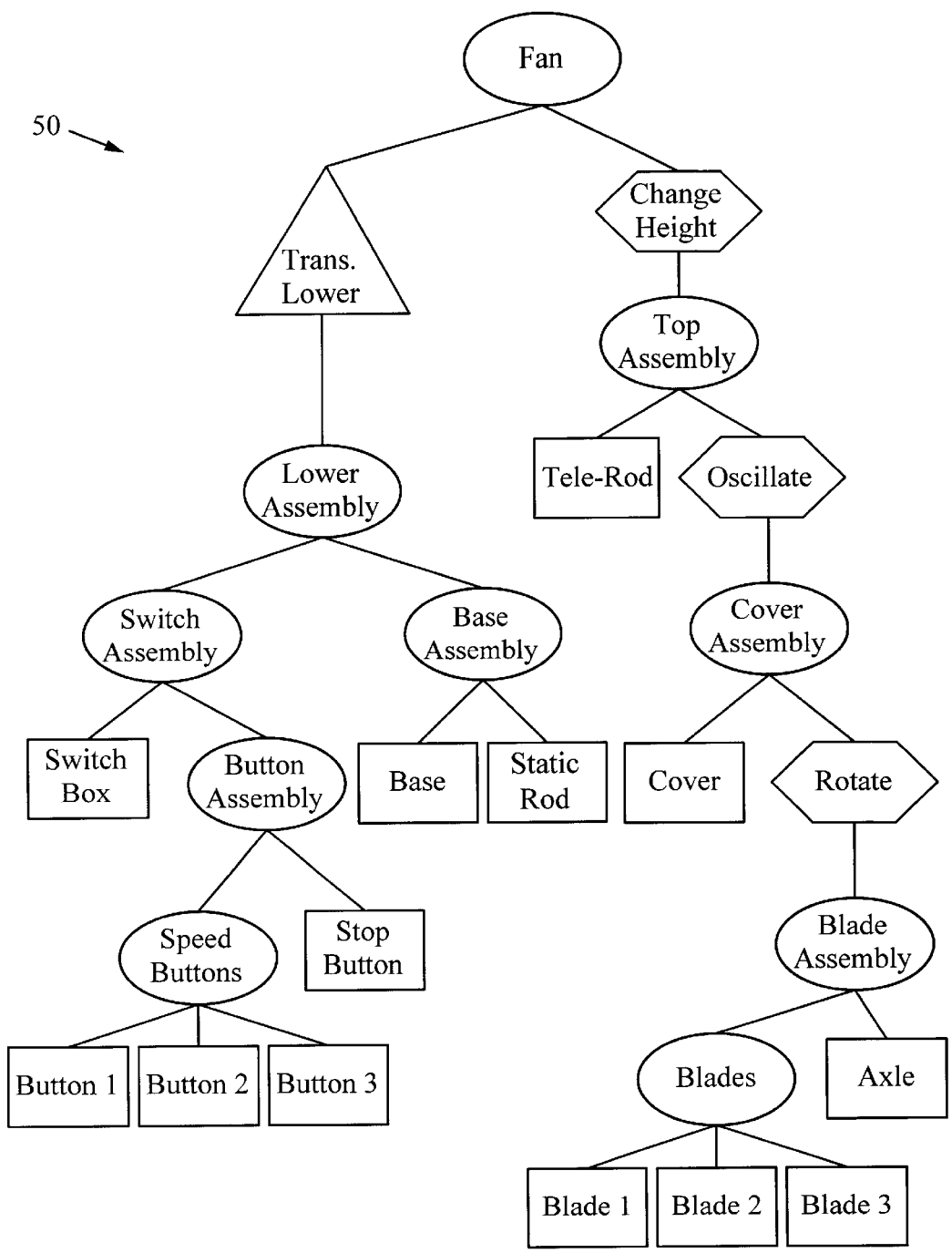
FIG. 3 is a tree representing a model of the object shown in FIG. 2.

FIG. 3 illustrates a VIS tree 50 of nodes representing the three-dimensional virtual interactive model of fan 20. The left side of tree 50 shows the construction of the lower part of fan 20. The three speed control buttons 36, 38, 40 are of type primitive node and they are combined using an operation node to form Speed__Buttons. The color of the primitive node indicates the color of that primitive in the model. Speed__Buttons 36, 38, 40 are combined with Stop__Button 42 primitive node to form the Button__Assembly. Button__Assembly is combined with the Switch__Box to form the Switch__Assembly corresponding to control console 34. Base 44 and static rod 32 primitive nodes are combined to form the Base__Assembly. Base__Assembly is combined with the Switch__Assembly to form the Lower__Assembly. This Lower__Assembly is translated by Trans__Lower, which is a transformation node, so that we can have the upper part of fan 20 on top of the Lower__Assembly.

The right side of tree 50 shows the construction of the upper part of fan 20. The three blades 24, 26, 28 are of the type primitive node and are combined to form a Blades node. Blades node is combined with axle 30, which is also a primitive node, to form the Blade__Assembly node corresponding to blade assembly 22. A rotation behavior Rotate in the form of an interaction node is added to the Blade__Assembly. Rotate controls the speed of rotation of fan 20 and also turns it on and off. Rotate is combined with the Cover primitive mode corresponding to cover 23 of fan 20 to form the Cover__Assembly. A rotation behavior, Oscillate, also in the form of an interaction node, is added to the Cover__Assembly. Oscillate controls the oscillation of the fan 20. Oscillate is combined with Tele__Rod primitive node to form Tele__Assembly. A translation behavior, Change__Height, an interaction node, is added to Tele__Assembly. Change__Height controls the height adjustments of the fan. Change__Height is combined with Lower__Assembly to form the Fan 20.

Figure 4:
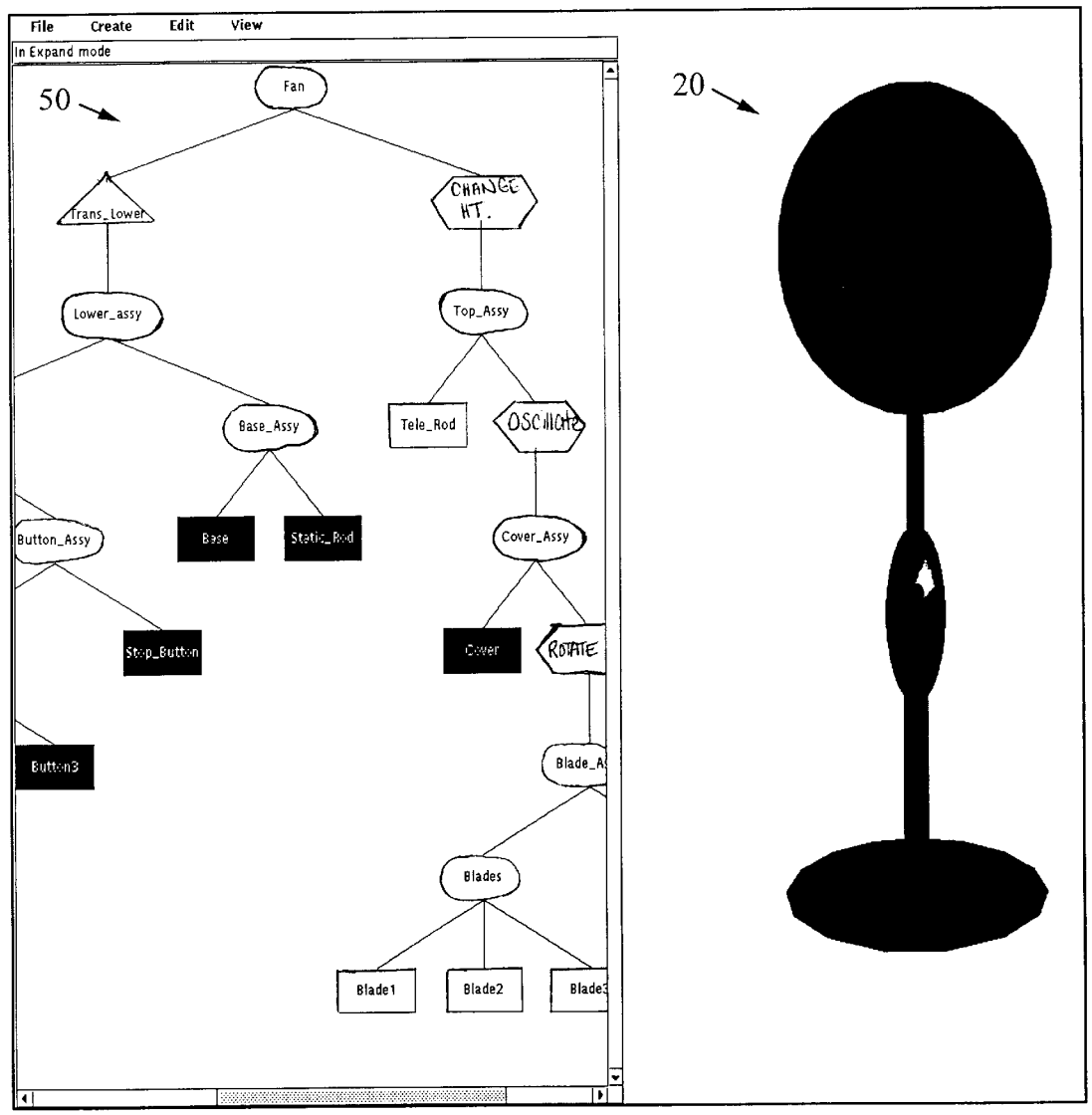
FIG. 4 is a screen shot of the VISDOM tool for building a tree according to the invention.

Preferably, VIS tree 50 is built by VISDOM, a tool with a user interface allowing for simple and expedient construction of tree 50. Conveniently, VISDOM is a platform__independent tool or is at least available on a number of platforms. An exemplary screen shot of the VISDOM tool as applied in constructing tree 50 of fan 20 is shown in FIG. 4.

In VISDOM, nodes 10, 12, 14, 16 can be created and attached to a VIS tree. The user interface displays VIS tree 50 on the left and the 3D model of fan 20 on the right. Among other, VISDOM can support the following primitives: cone, cuboid, cylinder, ellipsoid, prism, pyramid, sphere, hollow prism, hollow pyramid, hollow pyramid sector, swept solid. It is possible to translate, rotate, scale the primitives using the transformation nodes. The transformation values can either be entered manually or by moving the corresponding 3D object in the right window. It is possible to add movements, interactive behaviors and sound using the interaction node. Attach, unite, subtract, intersect, copy rotate and copy translate operations are supported to combine the nodes to form complex shapes. The nodes in the tree can be edited/modified at any time and 3D model will be updated immediately. The tree can be saved to a binary or ASCII VIS file. It is also possible to insert a tree from a VIS file to another tree.

The method of the invention and the trees generated with it are particularly useful for displaying products on company websites, allowing the consumer to view and examine the product at a level comparable to that provided by a real object. That is because the VIS file format for storing interactive three-dimensional models is very efficient. The file size is small even compared to the most efficient image format (GIF). The following table compares the file size for storing tree 50 of fan 20 in different formats.

| Format | File Size (in bytes) |
| --- | --- |
| VIS format | 1091 |
| GIF image | 20836 |
| 3DS format | 68535 |
| VRML97 format | 116266 |
| Binary STL | 126684 |
| Waveform OBJ | 129527 |
| DXF format | 390907 |
| ASCII STL | 495900 |

It will be clear to one skilled in the art that the above embodiment may be altered in many ways without departing from the scope of the invention.

What is claimed is:

1. A method of making a three dimensional virtual interactive model of an object to be displayed to a viewer, said method comprising:
   a) translating said object into primitive nodes comprising geometrical attributes of said object and at least one non-geometrical attribute of said object;
   b) coding dynamic behaviors of said object in interaction nodes;
   c) coding transformation behaviors of said object in transformation nodes;
   d) coding in operations nodes combinatorial operations to be performed on a combination of at least one of said primitive nodes, said interaction nodes and said transformation nodes;
   e) building a tree of said three dimensional virtual interactive model using said primitive nodes, said interaction nodes, said transformation nodes and said operations nodes; and
   f) storing said tree in a virtual interactive solids (VIS) file.

2. The method of claim 1, wherein said primitive nodes are used as leaf nodes in said tree.

3. The method of claim 1, wherein said at least one non-geometrical attribute is selected from the group of attributes consisting of color, texture and transparency.

4. The method of claim 1, wherein said dynamic behaviors of said object are selected from the group of behaviors consisting of movements and sounds.

5. The method of claim 1, wherein said transformation behaviors of said object are selected from the group of behaviors consisting of translation, rotation and scaling.

6. The method of claim 1, wherein said three dimensional virtual interactive model is displayed to said viewer over a network.

7. The method of claim 6, wherein said network is the world wide web.

8. The method of claim 6, further comprising the step of constructing said tree via a platform-independent user interface.

9. The method of claim 1, further comprising parsing said tree stored in said VIS file for displaying to said viewer over the world wide web.

10. The method of claim 1, wherein file size of said virtual interactive solids (VIS) file is small compared to file size of a graphics interchange format (GIF) file storing said tree.

11. The method of claim 1, further comprising editing said tree.

12. A storage medium tangibly embodying computer executable instructions implementing the steps of:
   a) translating an object to be displayed to a viewer as a three dimensional virtual interactive model into primitive nodes, said primitive nodes comprising geometrical attributes of said object and at least one non-geometrical attribute of said object;
   b) coding dynamic behaviors of said object in interaction nodes;
   c) coding transformation behaviors of said object in transformation nodes;
   d) coding in operations nodes combinatorial operations to be performed on a combination of at least one of said primitive nodes, said interaction nodes and said transformation nodes;
   e) building a tree of said three dimensional virtual interactive model using said primitive nodes, said interaction nodes, said transformation nodes and said operations nodes; and
   f) storing said tree in a virtual interactive solids (VIS) file.

13. The storage medium of claim 12, further comprising computer executable instructions implementing the step of parsing said three dimensional virtual interactive model stored in said virtual interactive solids (VIS) file for displaying to said viewer over the world wide web.

14. The storage medium of claim 12, wherein said primitive nodes are used as leaf nodes in said tree.

15. The storage medium of claim 12, wherein said at least one non-geometrical attribute is selected from the group of attributes consisting of color, texture and transparency.

16. The storage medium of claim 12, wherein said dynamic behaviors of said object are selected from the group of behaviors consisting of movements and sounds.

17. The storage medium of claim 12, wherein said transformation behaviors of said object are selected from the group of behaviors consisting of translation, rotation and scaling.

18. A computer system programmed to perform the method of claim 1.

* * * * *